United States Patent Office 3,453,232
Patented July 1, 1969

3,453,232
FLUOROSILICON MOLDING RESINS
Willard D. Larson, Midland, Mich., assignor to Dow Corning Corporation, Midland, Mich., a corporation of Michigan
No Drawing. Filed July 20, 1967, Ser. No. 654,679
Int. Cl. C08g 31/20
U.S. Cl. 260—46.5       5 Claims

ABSTRACT OF THE DISCLOSURE

This invention involves a novel process for preparing fluoroalkylsilicon resins in which the steps are admixing with an aqueous system having a pH below 7.0 from 30 to 90 mol percent perfluoroalkylethylalkoxysilanes and optionally, either a diorganodifunctional silane or a trifunctional silane, and thereafter neutralizing the acid and separating the cohydrolyzate from the aqueous system, followed by washing and subsequent recovery of the fluoroalkylsilicon resin. Illustrative of the admixture of silanes is a mixture of 50 mol percent $CF_3CH_2CH_2Si(OCH_3)_3$, 30 mol percent

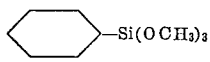

and 20 mol percent

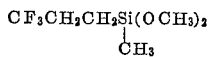

The invention also discloses novel siloxane copolymers which are prepared by the above method. Illustrative of such a copolymer is 75 mol percent of units of the formula $CF_3CH_2CH_2SiO_{3/2}$, 10 mol percent of units of the formula

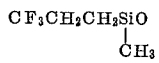

and 15 mol percent of units of the formula $CH_3SiO_{3/2}$.

SPECIFICATION

This invention relates to a process for making fluoroalkylsilicon resins and more particularly to a novel process for producing fluoroalkylsilicon resins that are especially suitable as molding compounds which possess excellent stability under both extensive heat and pressure.

It has been heretofore known that certain fluoroalkylsilicon resins could be prepared by a partial hydrolysis of the proper mixture of alkoxy silanes followed by a condensation between silanol and alkoxy radicals. The above method is disclosed in U.S. Patent No. 3,298,997. In this method, the successful curing of the resins was dependent upon the existence of a specific catalyst and the presence of a minimum amount of silicon atoms in the mixture having aryl, alkaryl, or aralkyl substituents bonded thereto. In the absence of these very specific and imperative requirements, the invention was found to be essentially inoperative.

It has also been known that all previous attempts to start with compounds such as $RSiCl_3$, $RCH_3SiCl_2$ (R= perfluoroalkylethyl) or other halo or alkoxy equivalents to make resins, result in either cyclic materials or brittle, friable solids that melt when heated (British Patent No. 982,429).

It is an object of the present invention to provide novel fluoroalkylsilicon resins that can be prepared by methods which are far more expedient and economical than those previously known.

Applicant has surprisingly found that when employing an aqueous admixture of the proper silanes under acidic conditions, followed by neutralization and separation of the cohydrolyzates with subsequent washing of said cohydrolyzates, the resins obtained thereby can be ultimately cured to useful molding materials without regard to the necessity of having a minimum amount of aryl, alkaryl, or aralkyl radicals present in the mixture. In addition, it was further discovered that the curing of these resins could be accomplished through the use of conventional curing means, e.g., organic catalysts.

Applicant has also found that one can start with alkoxy equivalents to produce resins which are useful as molding compounds. The process does not result in cyclic materials nor does it result in brittle, friable solids that melt when heated.

This invention relates to a process for preparing novel fluoroalkylsilicon resins, which process comprises (1) Admixing with an aqueous system having a pH below 7.0

(a) from 30 to 90 mol percent of silanes of the general formula $RSiX_3$, in which R is a perfluoroalkylethyl radical and in which X is a member selected from the group consisting of an alkoxy radical and an acyloxy radical containing less than 7 carbon atoms, (b) from 0 to 40 mol percent of silanes of the general formula $RR'SiX_2$, in which R and X are as above defined and in which R' is selected from the group consisting of monovalent hydrocarbon radicals and R radicals, (c) from 0 to 50 mol percent of organosilanes of the general formula $YSiX_3$, in which X is as above defined and in which Y is a monovalent hydrocarbon radical, there being a total of 100 mol percent of (a), (b), and (c).

(2) Neutralizing the acid and separating the cohydrolyzate from the aqueous system,
(3) Washing said cohydrolyzates and thereafter,
(4) Recovering the said fluoroalkylsilicon resin.

In the above-defined formulae, R can be a perfluoroalkylethyl radical of the formula $C_xF_{2x+1}CH_2CH_2$—, in which $x$ is an integer of from 1 to 10 inclusive. The perfluoroalkylethyl radical can contain from 3 to 12 carbon atoms such as the 3,3,3-trifluoropropyl, 3,3,4,4,5,5,5-heptafluoropentyl, $C_{10}F_{21}C_2H_4$—, $(CF_3)_2CFCH_2CH_2$—, $CF_3CF_2CF(CF_3)CH_2CH_2$—, and the $C_2F_5CH_2CH_2$— radical among others. Although any of the aforementioned perfluoroalkylethyl radicals can function effectively in this invention, 3,3,3-trifluoropropyl is normally preferred due to its commercial availability.

X can be alkoxy radical containing less than 7 carbon atoms such as the methoxy, ethoxy, propoxy, isopropoxy, butoxy, isobutoxy, and the hexoxy radical. X can also be an acyloxy radical of less than 7 carbon atoms such as the acetoxy, proprionoxy, butyroxy, and the hexooxy radical.

Illustrative of the R' radical which can be a monovalent hydrocarbon radical is the methyl, ethyl, propyl, isopropyl, butyl, isobutyl, t-butyl, decyl, dodecyl, octadecyl, myricyl, pentyl, isopentyl, hexyl, isohexyl, cyclohexyl, cyclobutyl, cyclohexenyl, vinyl, allyl, methallyl, hexenyl, octadecenyl, beta-phenylpropyl, beta-phenylethyl, phenyl, tolyl, xylyl, ethylphenyl, mesityl, methylethylphenyl, n-propylphenyl, propylphrenyl, isopropylphenyl, diethylphenyl, pentamethylphenyl, amylphenyl, butylmethylphenyl, propylmethylphenyl, ethyltrimethylphenyl, diethylmethylphenyl, hexylphenyl, cyclohexylmethylphenyl, amylmethylphenyl, butylmethylphenyl, butyldimethylphenyl, propylethylmethylphenyl, diphenyl, dipropylphenyl, naphthyl, 1-methylnaphthyl, 2-methylnaphthyl, 1-ethylnaphthyl, 2-ethylnaphthyl, anthracyl, 9-methylanthracyl, 2,3-dimethylanthracyl, 2,4-dimethylanthracyl, 9-ethylanthracyl, phenanthryl, 3-methylphenanthryl, and the 1,4-dimethylphenanthryl radical among numerous others.

Y can be a monovalent hydrocarbon radical and illustrative examples of such radicals are those which have been previously set forth for R'.

It is to be noted that the admixture of hydrolyzable silanes in the present invention can comprise (a), (b) and (c), or (a) and (b), or (a) and (c). In any case, it is only required that there be at least 30 mol percent of (a) present to achieve the objects of this invention.

It is to be further noted that the cohydrolyzates herein defined can be prepared by alternative methods. For example, the trifunctional silane (a), the difunctional silane (b), and the trifunctional silane (c) can be admixed together and completely hydrolyzed to recover the desired cohydrolyzate. Alternatively, each silane can be completely hydrolyzed individually and subsequently admixed to obtain the resulting cohydrolyzate absent resultant deleterious effects. Hence, it is only necessary that the required silanes be completely hydrolyzed in one manner or the other to effectuate the purposes of this invention.

This invention also relates to a siloxane copolymer consisting essentially of
(a) From 70 to 90 mol percent of units of the formula $RSiO_{3/2}$, in which R is as above defined,
(b) From 0 to 30 mol percent of units of the formula $RR'SiO$, in which R and R' are as above defined, and
(c) From 0 to 30 mol percent of units of the formula $ZSiO_{3/2}$, in which Z is a member selected from the group consisting of alkyl radicals and unsaturated aliphatic hydrocarbon radicals, there being a total of 100 mol percent of (a), (b), and (c).

Therefore, in the above formulae, Z can be an alkyl radical such as the methyl, ethyl, propyl, isopropyl, butyl, isobutyl, amyl, octyl, decyl, dodecyl, and the myricyl radical. Z can also be an unsaturated aliphatic hydrocarbon radical such as the vinyl, allyl, methallyl, hexenyl, pentenyl, decenyl, 2,4-hexadienyl, acetylene, and the cyclohexenyl radical including many others.

The cohydrolyzates of the present invention are readily prepared by admixing the trifunctional silane (a), the difunctional silane (b), and the trifunctional silane (c), order of addition being unimportant. Complete hydrolysis is achieved by the addition of an excess of water. Although a mere excess is sufficient to effect a complete hydrolysis, it has been found that an excess of water in terms of an approximate 5 to 1 equivalent ratio of water to the alkoxysilane is preferable and, in fact, quite desirable. The novel hydrolyzates of the present invention are then condensed at a temperature of less than 100° C., and preferably at about room temperature and ultimately cured in the presence of conventional catalysts.

The cohydrolyzates are subsequently washed, preferably in the presence of a basic catalyst, i.e., $NH_4OH$, etc., to insure that complete hydrolysis has occurred prior to extensive condensation. Absent the necessary washing, residual alkoxy groups may be present in the ultimate resin and, thus, they will be unsuitable as molding compounds because they will be incapable of withstanding elevated temperatures and/or extensive pressures.

Following the above hydrolysis and necessary washing, the resins can be ultimately cured with a conventional organic catalyst. Any of the conventional catalysts have been found to be suitable such as methylamine, ethylamine, n-butylamine, triethylamine, and carboxylic acid salts of metals such as lead, tin, iron, tetramethylguanidine, and tetramethylguanidine-2-ethylhexoate, among others. However, in view of practical considerations and the like, it is normally preferred that tetramethylguanidine be employed as the catalyst. The amount of catalyst used is not critical with the exception that it be present in sufficient amounts to effect an acceptable cure. Therefore, trace amounts to 5.0 percent catalyst by weight is satisfactory; however, for general purposes a catalytic range of from .01 to 1.0 percent catalyst by weight has been found to be suitable.

The following examples are merely illustrative and are not intended to limit the scope of the invention which is properly delineated in the appended claims.

EXAMPLE 1

A mixture of 40 mol percent $CF_3CH_2CH_2Si(OCH_3)_3$, 30 mol percent

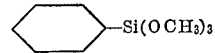

and 30 mol percent

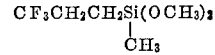

was added to a 4 liter separatory funnel. 600 ml. of water acidified with .05 N HCl was added to facilitate the reaction and the admixture was stirred for approximately 15 minutes. The reaction was exothermic and the mixture became one phase. After cooling, 600 ml. of methylene chloride was added and the entire mixture was again stirred while 4 grams of 6 N $NH_4OH$ was added dropwise to neutralize the admixture. The water layer was separated and discarded and an additional 600 ml. of water was added to wash the material. The mixture was allowed to stand for a short period of time after which the water layer was again discarded. The washing step was again repeated and the resin was then transferred to a resin kettle and the methylene chloride was stripped. A sample of the resin was then catalyzed with a trace amount of tetramethylguanidine and placed in an oven at 150° C. A hard, infusible, transparent film was obtained. A second sample of the resin was appropriately formulated with a filler and subsequently cured so that a molded article was obtained.

EXAMPLE 2

A mixture of 50 mol percent $CF_3CH_2CH_2Si(OCH_3)_3$, 30 mol percent

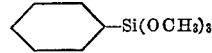

and 20 mol percent

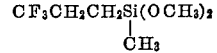

was added to a 4 liter separatory funnel. 600 ml. of water acidified with 6 N NCl was added and the admixture was stirred until it was homogeneous. After cooling, 930 ml. of methylene chloride was added and the entire mixture was again stirred while about 4 grams of 6 N $NH_4OH$ was added dropwise. The resin layer was drawn off and individually washed 3 times with 600 ml. of water. After all of the water was discarded a sample of the resin was transferred to a resin kettle and a sample of the resin was catalyzed with a trace amount of tetramethylguanidine and placed in an oven at 150° C. A hard, infusible, transparent film suitable for molding compounds was obtained.

EXAMPLE 3

Equivalent results were obtained when the following silanes were substituted for the corresponding silanes of Example 2.

(A) 65 mol percent $CF_3CH_2CH_2Si(OCH_3)_3$, 25 mol percent

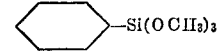

and 10 mol percent

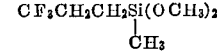

(B) 50 mol percent $CF_3CH_2CH_2Si(OCH_3)_3$, 20 mol percent $CH_3Si(OCH_3)_3$, and 30 mol percent

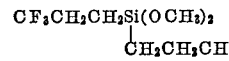

(C) 40 mol percent $CF_3CH_2CH_2Si(OCH_3)_3$, 30 mol percent

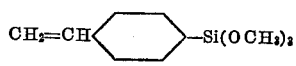

and 30 mol percent

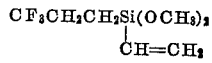

(D) 85 mol percent $CF_3CH_2CH_2Si(OCH_2CH_2CH_3)_3$, and 15 mol percent $CH_3Si(OCH_3)_3$.

(E) 70 mol percent $$CF_3CH_2CH_2(OCH_2CH_2CH_2CH_2CH_2CH_3)_3$$

and 30 mol percent

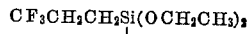

(F) 90 mol percent $CF_3CH_2CH_2Si(OCH_3)_3$ and 10 mol percent

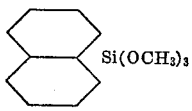

(G) 40 mol percent $CF_3CH_2CH_2Si(OCH_3)_3$, 20 mol percent

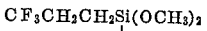

and 40 mol percent

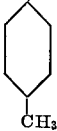

(H) 65 mol percent $CF_3CH_2CH_2Si(OCH_3)_3$, 25 mol percent

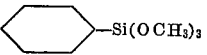

and 10 mol percent

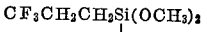

(I) 30 mol percent

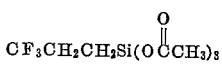

40 mol percent $C_{18}H_{37}Si(OCH_2CH_2CH_2CH_3)_3$, and 30 mol percent

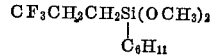

(J) 45 mol percent $CF_3CH_2CH_2Si(OCH_2CH_3)_3$ and 15 mol percent $CH_3CH_2Si(OCH_3)_3$, and 40 mol percent

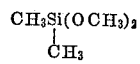

(K) 80 mol percent

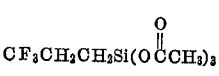

10 mol percent

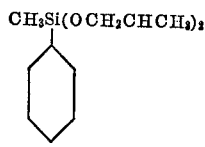

10 mol percent

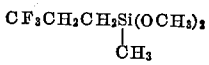

EXAMPLE 4

A mixture of 55 mol percent $CF_3CH_2CH_2Si(OCH_3)_3$, 15 mol percent $CH_3Si(OCH_3)_3$, and 30 mol percent $$CF_3CH_2CH_2Si(OCH_3)_2$$
$$|$$
$$CH_3$$

was added to a 4 liter separatory funnel. An excess of water acidified with .05 N HCl was added to facilitate the reaction and the admixture was stirred for about 10 minutes. After cooling, an equal volume of methylene chloride was added and the entire mixture was again stirred while $NH_4OH$ was added dropwise to neutralize the mixture and effect partial condensation. The mixture was slightly reacidified to ease separation. The water layer was discarded and the material washed twice with equal volumes of water. The resin solution was transferred to a resin kettle and the residual methylene chloride stripped off. After being stripped and heat bodied, the viscous resin was dissolved in a commercially available high boiling ether. To determine solids, a sample of the resin solution was placed in an aluminum cup and dried in an oven at 135° C. for 3 hours. The solids content was 71.0 percent. To determine weight loss, the same sample was placed in an oven at 250° C. for one hour. The weight loss was 2.55 percent.

For comparative purposes, a similar formulation was processed in the same fashion with the exception that chlorine was substituted for the alkoxy radicals on the fluorine-containing silanes. The weight loss was 25.7 percent thus indicating that large amounts of cyclics were formed.

That which is claimed is:

1. A process for preparing novel fluoroalkyl silicon resins characterized by
   (1) admixing with an aqueous system having a pH below 7.0
      (a) from 30 to 90 mol percent of silanes of the general formula $RSiX_3$, in which R is a perfluoroalkylethyl radical and in which each X is an alkoxy radical or an acyloxy radical containing less than 7 carbon atoms,
      (b) from 0 to 40 mol percent of silanes of the general formula $RR'SiX_2$, in which R and X are as above defined and in which R' is selected from the group consisting of monovalent hydrocarbon radicals and perfluoroalkylethyl radicals,
      (c) from 0 to 50 mol percent of organosilanes of the general formula $YSiX_3$, in which X is as above defined and in which Y is a monovalent hydrocarbon radical, there being 100 mol percent of (a), (b), and (c),
   (2) neutralizing the acid and separating the cohydrolyzate from the aqueous system,
   (3) washing the cohydrolyzate with water and thereafter
   (4) recovering the fluoroalkyl silicon resin.

2. The process as recited in claim 1 wherein (b) is present in a range of from 0 to 25 mol percent, (c) is present in a range of from 15 to 30 mol percent, and the remainder is (a), there being 100 mol percent of (a), (b), and (c).

3. The process as recited in claim 2 wherein (a) is 75 mol percent, (b) is 10 mol percent, and (c) is 15 mol percent.

4. The process as recited in claim 3 wherein (a) has the formula $CF_3CH_2CH_2Si(OCH_3)_3$, (b) has the formula

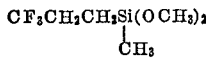

and (c) has the formula

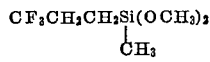

5. The process as recited in claim 3 wherein (a) has the formula $CF_3CH_2CH_2Si(OCH_3)_3$, (b) has the formula

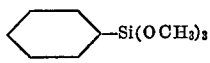

and (c) has the formula $CH_3Si(OCH_3)_3$.

References Cited

UNITED STATES PATENTS

| 3,122,521 | 2/1964 | Pierce | 260—46.5 |
| 3,179,619 | 4/1965 | Brown | 260—46.5 |
| 3,228,903 | 1/1966 | Dennis | 260—46.5 |
| 3,298,997 | 1/1967 | Holbrook | 260—46.5 |
| 3,354,095 | 11/1967 | Burzynski et al. | 252—451 |

DONALD E. CZAJA, *Primary Examiner.*

M. I. MARQUIS, *Assistant Examiner.*

U.S. Cl. X.R.

260—37, 448.2